Oct. 5, 1948.  J. B. KARNOWSKI  2,450,597
EARTHWORM DISGORGING DEVICE
Filed Jan. 12, 1944
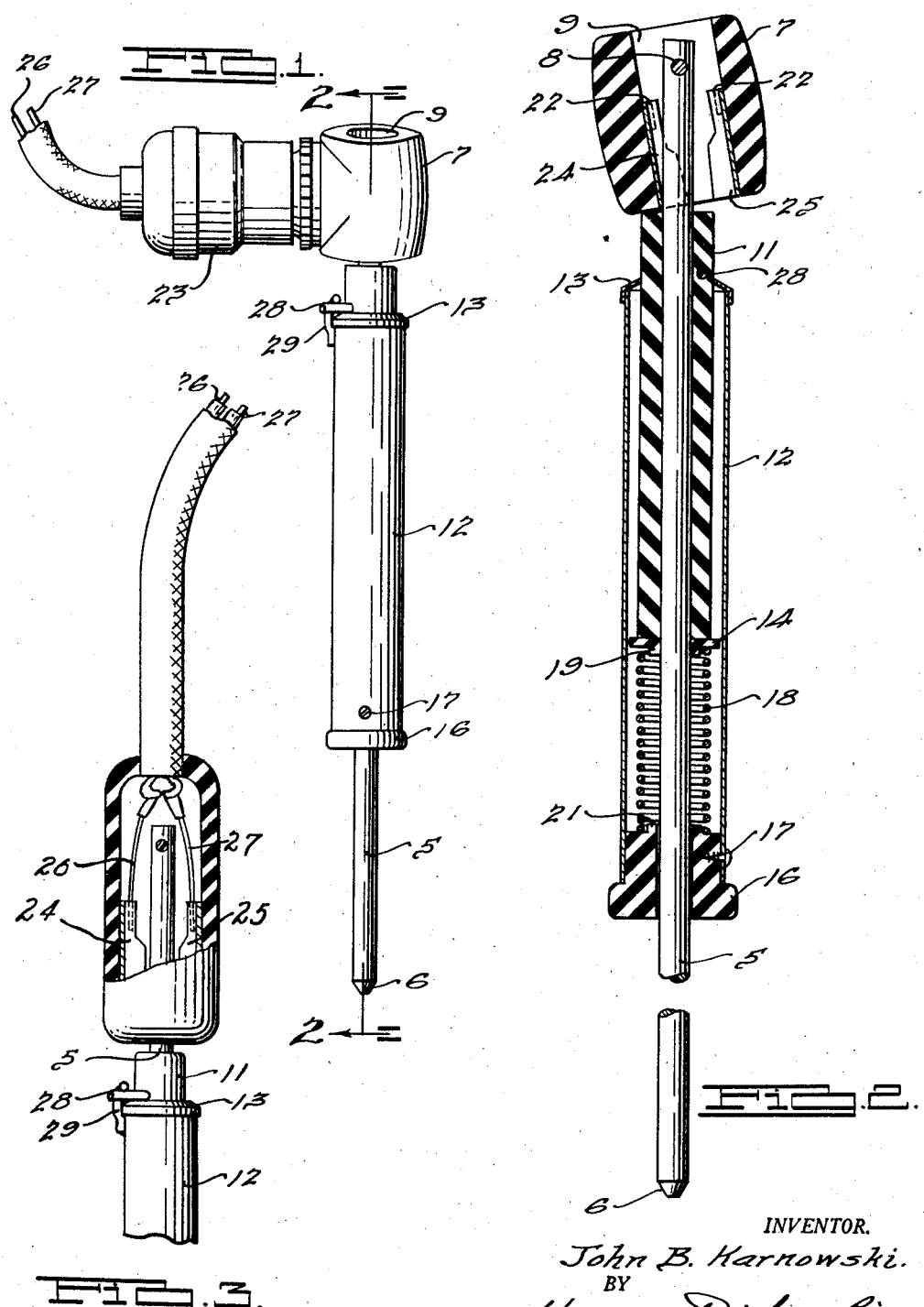
INVENTOR.
John B. Karnowski.
BY
Harness, Dickey & Pierce
ATTORNEYS.

UNITED STATES PATENT OFFICE 2,450,597

EARTHWORM DISGORGING DEVICE

John B. Karnowski, Detroit, Mich.

Application January 12, 1944, Serial No. 517,971

13 Claims. (Cl. 47—1.3)

This invention relates to an earth worm disgorging device and particularly to an insulated electrode having a tiltable head by which conductors are selectively joined thereto.

It has long been known that the passage of an electric current into the ground will react upon the earth worms in the vicinity thereof in a manner to cause them to come to the surface. Devices have been manufactured and used embodying a rod having an insulating handle and a circuit by which the rod is connected to one or the other conductors of an alternating current circuit. Since one of these conductors is grounded, it is necessary that the other ungrounded conductor be joined to the electrode. If the earth worms do not immediately come to the surface from the ground after the conductor of the electrode is connected to one of the conductors of a circuit, then the terminal is reversed to connect the conductor of the electrode to the other conductor of the circuit. In manipulating the electrode, serious shock has been received by the operator which oftentimes has proved fatal.

The earth must be in a moist condition when the electrode is employed effectively and when the operator standing on the wet ground is disposed in series with the electrode, the damaging shock results.

The present invention embodies an electrode constructed in a manner to overcome these two major difficulties. A pivoted head is provided on the electrode by which either conductor of the supply circuit may be joined to the electrode by the tilting of the head relative thereto. The hazard of obtaining a shock by coming in series between the electrode and ground has been overcome by insulating a portion of the electrode and providing a casing which encompasses the uninsulated portion and is movable therefrom to expose the uninsulated portion prior to, or when inserting the electrode in the earth. A releasable catch may be employed for retaining the casing in position to expose the uninsulated portion of the electrode, which casing is normally biased by a spring to extend thereover.

One object of this invention is to provide a spring pressed casing for enclosing the uninsulated portion of the electrode which is retractable as the electrode is inserted in a material.

A further object of the invention is to mount on the end of an electrode an insulating head having a pair of spaced contacts connected to a pair of conductors and disposed in such manner as to have the contacts selectively movable into engagement with the electrode.

A further object of the invention is to provide an electrode with an insulating element which is disposed adjacent to a pivotal head which is tiltable to selectively join the electrode to one of a pair of conductors and enclose the lower uninsulated portion of the electrode in a retractable casing.

Other objects and features of the novelty of this invention will be specifically pointed out, or will become apparent, when referring for a better understanding of the invention, to the following description taken in conjunction with the accompanying drawing, wherein Figure 1 is a view in elevation of an earth worm disgorging device embodying features of this invention;

Fig. 2 is an enlarged broken sectional view of the structure illustrated in Fig. 1, taken on the line 2—2 thereof, Fig. 3 is a broken view of structure, similar to that illustrated in Fig. 1, disclosing a modified form of the invention.

Referring more particularly to Figs. 1 and 2, an earth worm disgorging device embodies an electrode 5 which is herein illustrated as a round rod made of conducting material having a pointed end 6 by which it is readily insertable in the earth or other substance. The upper end of the electrode 5 has an insulating head 7 secured thereon by a pivot 8. The head is provided with a central aperture 9 in which the end of the electrode 5 projects. Adjacent to the head 7 an insulating sleeve 11 is secured for insulating the upper portion of the electrode. A tubular casing 12 extends over the insulating sleeve 11, having a flanged cap 13 which engages a washer 14 at the bottom of the sleeve 11, and limits the downward movement of the casing 12.

An apertured insulating block 16 is secured over the uninsulated end of the electrode 5 having a portion projecting within the casing 12 where it is secured by a plurality of screws 17. A spring 18 is disposed between the washer 14 and the end of the block 16 for urging the casing 12 downwardly until the cap 13 engages the washer 14 to completely encompass the uninsulated portion of the electrode 5. A projection 19 on the washer 14, and a similar projection 21 on the block 16, extends within the ends of the spring 18 for centering the spring and preventing the spring from contacting the casing 12 when the casing is made of metal. It is to be understood that the casing may be made of insulating material and that such contact with the spring would produce no hazard to the operator.

The pivoted insulating head 7 is provided with a pair of contact fingers 22 by which a connector 23 is joined to the head in the conventional manner. The fingers 22 extend through the wall of the head 7 and conductively engage a pair of contacts 24 and 25 in the plane of movement of the electrode 5 on the pivot 8. By tilting the head in a counter-clockwise direction, as illustrated in Fig. 2, the contact 24 engages the electrode 5 and completes a circuit therewith. When the head is moved in a clockwise direction, the contact 24 is moved out of engagement with the electrode 5 and the contact 25 engages and completes a circuit therewith. The pivotal head and contacts 24 and 25 provide a switch arrangement whereby either conductor 26 or 27 may be joined to the electrode 5 by relatively tilting the head and electrode. A pin 28 extends through the insulating sleeve 11 in position to be releasably engaged by a latch 29 secured to the upper end of the casing 12.

When it is desired to disgorge earth worms from the ground, the conductors 26 and 27 may be plugged into an electrical supply circuit, and the device moved to a spot where the earth is damp and the earth worms will be prevalent near the top of the earth. The device is then placed against the ground and pushed downwardly to insert the electrode 5 into the earth as the casing 12 retracts upon the insulating sleeve 11. This movement is continued until the latch 29 engages the pin 28 and latches the casing 12 in retracted position to remove the bias from the block 16 which would tend to withdraw the end of the electrode 5 from the ground. If the earth worms do not appear within a reasonable time, the block 7 is tilted to its opposite position to connect the other contact 24 or 25 to the electrode. Such an arrangement avoids the necessity of removing the plug and reconnecting the plug with the conductors disposed in reversed positions. When it is desired to move the device to another position, the finger 29 of the casing 12 is preferably released from the pin 28 so that the upward withdrawal movement of the electrode permits the casing to move downwardly over the electrode as it is moved from the earth to prevent the operator from coming into circuit with the electrode and the earth, which, as pointed out hereinabove, has sometimes proved fatal.

In Fig. 3 a modified form of the invention is illustrated wherein the conductors 26 and 27 are directly connected to the two contacts 24 and 25. This eliminates the plug 23 and the contact fingers 22 which project from the side of the head 7. The current from one or the other conductor 26 or 27 is connected directly to the contacts 24 and 25, and these may be selectively joined to the electrode 5 after the electrode has been inserted in the ground.

What is claimed is:

1. The combination with an electrode, of an insulating element encompassing a portion of said electrode, a movable casing extending over the uninsulated portion of said electrode and movable over said insulating element to expose the uninsulated portion of said electrode, and a spring surrounding said electrode and disposed between said element and casing for urging said casing over the uninsulated portion of said electrode.

2. The combination with an electrode, of an insulating element encompassing a portion of said electrode, a movable casing extending over the uninsulated portion of said electrode and movable over said insulating element to expose the uninsulated portion of said electrode, a spring surrounding said electrode and disposed between said element and casing for urging said casing over the uninsulated portion of said electrode, and means for releasably securing said casing over said insulating element against the bias of said spring for exposing the uninsulated portion of said electrode.

3. The combination with an electrode, of an insulating element encompassing a portion of said electrode, a movable casing extending over the uninsulated portion of said electrode and movable over said insulating element to expose the uninsulated portion of said electrode, an insulating head pivoted on one end of said electrode, electric contact fingers projecting from one side of said head, and contacts within said head joined to said contact fingers and disposed in position to be selectively engaged by said electrode.

4. The combination with an electrode, of an insulating element encompassing a portion of said electrode, a movable casing extending over the uninsulated portion of said electrode and movable over said insulating element to expose the uninsulated portion of said electrode, an insulating head pivoted on one end of said electrode, electric contacts in said head selectively engageable with said electrode, and conductors connected to said contacts.

5. The combination with an electrode insertable in the ground of an insulating head for one end of the electrode, means for pivoting said head on said end, a pair of line conductors which produce a flow of current when connected together, which conductors are insulated from each other and extend into said head, and a pair of contacts joined to said conductors and disposed within the head in position to be selectively engaged by said electrode to complete a circuit through the ground by the selection of the proper conductor of the pair through the adjustment of the head.

6. The combination with an electrode insertable in the ground, of an insulating head for one end of the electrode, means for pivoting said head on said end, a pair of live conductors which produce a flow of current when connected together, which conductors are insulated from each other and extend into said head, a pair of contacts joined to said conductors and disposed within the head in position to be selectively engaged by said electrode to complete a circuit through the ground by the selection of the proper conductor of the pair through the adjustment of the head, and an insultating element extending over the upper portion of said electrode and having one end disposed adjacent to said head.

7. The combination with an electrode, of an insulating head for one end of the electrode, means for pivoting said head on said end, a pair of conductors joined to said head, a pair of contacts joined to said conductors and disposed within the head in position to be selectively engaged by said electrode, an insulating element extending over the upper portion of said electrode and having one end disposed adjacent to said head, and a casing extending over the lower uninsulated portion of said electrode and movable over said insulating element to expose said portion.

8. The combination with an electrode, of an insulating head for one end of the electrode, means for pivoting said head on said end, a pair of conductors joined to said head, a pair of contacts joined to said conductors and disposed within the head in position to be selectively engaged by said electrode, an insulating element extending over the upper portion of said electrode and having one end disposed adjacent to said head, a casing extending over the lower uninsulated portion of said electrode and movable over said insulating element to expose said portion, and a spring within said casing for urging it over the uninsulated portion of said electrode.

9. The combination with an electrode, of an insulating head for one end of the electrode, means for pivoting said head on said end, a pair of conductors joined to said head, a pair of contacts joined to said conductors and disposed within the head in position to be selectively engaged by said electrode, an insulating element extending over the upper portion of said electrode and having one end disposed adjacent to said head, a casing extending over the lower uninsulated portion of said electrode and movable over said insulating element to expose said portion, a spring within said casing for urging it over the uninsulated portion of said electrode, and releasable means for securing said casing in retracted position against the bias of said spring for exposing the uninsulated portion of the electrode.

10. In an earth worm disgorging device, an electrode insertable in the ground, and insulating head pivoted on one end of said electrode, a pair of contacts in said head selectively engageable with said electrode, an insulating element extending over the upper portion of said electrode adjacent to said head, and a pair of conductors extending into said head and connected to said contacts by which said electrode is connected to the proper conductor of the pair to complete a circuit through the ground by the adjustment of said head.

11. In an earth worm disgorging device, an electrode, an insulating head pivoted on one end of said electrode, a pair of contacts in said head selectively engageable with said electrode, an insulating element extending over the upper portion of said electrode adjacent to said head, and a casing insulated from the lower exposed end of said electrode and forming a cover therefor, said casing being movable over said insulating element to expose the uninsulated portion of said electrode.

12. In an earth worm disgorging device, an electrode, an insulating head pivoted on one end of said electrode, a pair of contacts in said head selectively engageable with said electrode, an insulating element extending over the upper portion of said electrode adjacent to said head, a casing insulated from the lower exposed end of said electrode and forming a cover therefor, said casing being movable over said insulating element to expose the uninsulated portion of said electrode, and a spring within said casing for urging the casing over the uninsulated portion of said electrode.

13. In an earth worm disgorging device, an electrode, an insulating head pivoted on one end of said electrode, a pair of contacts in said head selectively engageable with said electrode, an insulating element extending over the upper portion of said electrode adjacent to said head, a casing insulated from the lower exposed end of said electrode and forming a cover therefor, said casing being movable over said insulating element to expose the uninsulated portion of said electrode, a spring within said casing for urging the casing over the uninsulated portion of said electrode, and releasable securing means for retaining said casing over said insulating element against the bias of said spring with the lower uninsulated portion of the electrode exposed.

JOHN B. KARNOWSKI.

REFERENCES CITED

The following references are of record in the file of this patent:

UNITED STATES PATENTS

| Number | Name | Date |
| --- | --- | --- |
| 203,218 | Treman | Apr. 30, 1878 |
| 1,796,139 | Cromei | Mar. 10, 1931 |
| 2,131,090 | Beerman | Sept. 27, 1938 |

FOREIGN PATENTS

| Number | Country | Date |
| --- | --- | --- |
| 567,355 | Germany | Dec. 30, 1932 |

Certificate of Correction

Patent No. 2,450,597.

October 5, 1948.

JOHN B. KARNOWSKI

It is hereby certified that errors appear in the printed specification of the above numbered patent requiring correction as follows:

Column 4, line 33, claim 5, for the word "line" read *live*; column 5, line 29, claim 10, for "and insulating" read *an insulating*; line 34, same claim, after "conductors" insert *from a source of electrical energy*;

and that the said Letters Patent should be read with these corrections therein that the same may conform to the record of the case in the Patent Office.

Signed and sealed this 8th day of March, A. D. 1949.

[SEAL]

THOMAS F. MURPHY,
*Assistant Commissioner of Patents.*